US007206570B2

(12) United States Patent
Voehringer

(10) Patent No.: US 7,206,570 B2
(45) Date of Patent: Apr. 17, 2007

(54) METHOD FOR PROVIDING PRICE INFORMATION TO SUBSCRIBERS OF A DIGITAL MOBILE COMMUNICATION NETWORK

(75) Inventor: Gerrit Voehringer, Bonn (DE)

(73) Assignee: T-Mobile Deutschland GmbH, Bonn (DE)

( * ) Notice: Subject to any disclaimer, the term of this patent is extended or adjusted under 35 U.S.C. 154(b) by 65 days.

(21) Appl. No.: 10/472,335

(22) PCT Filed: Mar. 26, 2002

(86) PCT No.: PCT/DE02/01104

§ 371 (c)(1),
(2), (4) Date: Feb. 9, 2004

(87) PCT Pub. No.: WO02/078315

PCT Pub. Date: Oct. 3, 2002

(65) Prior Publication Data

US 2004/0116136 A1 Jun. 17, 2004

(30) Foreign Application Priority Data

Mar. 27, 2001 (DE) .................................. 101 14 964

(51) Int. Cl.
*H04M 11/00* (2006.01)
(52) U.S. Cl. ...................... 455/407; 455/408; 455/406; 455/422.1; 379/114.01; 379/130
(58) Field of Classification Search ................ 455/406, 455/407, 408, 432.1, 433, 466, 457; 379/207.02, 379/114.29, 113, 114.01, 133; 370/354, 370/400
See application file for complete search history.

(56) References Cited

U.S. PATENT DOCUMENTS

| 5,303,297 | A | * | 4/1994 | Hillis ........................ 455/406 |
| 5,592,535 | A | * | 1/1997 | Klotz ........................ 455/406 |
| 5,784,442 | A | * | 7/1998 | Foti ........................... 455/405 |
| 6,018,652 | A | * | 1/2000 | Frager et al. ............... 455/406 |
| 6,195,543 | B1 | * | 2/2001 | Granberg .................... 455/407 |
| 6,347,224 | B1 | * | 2/2002 | Smyth et al. ............... 455/406 |
| 6,556,817 | B1 | * | 4/2003 | Souissi et al. .............. 455/406 |
| 6,570,973 | B1 | * | 5/2003 | Boughman et al. ..... 379/207.02 |
| 6,690,929 | B1 | * | 2/2004 | Yeh ............................ 455/406 |
| 2002/0006125 | A1 | * | 1/2002 | Josse et al. ................. 370/354 |
| 2002/0091941 | A1 | * | 7/2002 | Challener et al. .......... 713/201 |

FOREIGN PATENT DOCUMENTS

EP    1128652 A2 *  8/2001

OTHER PUBLICATIONS

Hamann et al., WO 99/08436, see abstract, Aug. 5, 1998.*

* cited by examiner

*Primary Examiner*—Temica Beamer
*Assistant Examiner*—Joy K. Contee
(74) *Attorney, Agent, or Firm*—Cooper & Dunham LLP

(57) ABSTRACT

The invention relates to a method for providing price information to subscribers of a digital mobile communication network. The aim of the invention is to inform the subscriber of the cost of a call he/she is about to make, in a simple manner. To this end, when the subscriber dials a call number, he/she obtains information on the rate to expect for a communication by means of short messaging service (SMS).

8 Claims, 1 Drawing Sheet

METHOD FOR PROVIDING PRICE INFORMATION TO SUBSCRIBERS OF A DIGITAL MOBILE COMMUNICATION NETWORK

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC OR REFERENCE TO A MICROFICHE APPENDIX

Not Applicable

BACKGROUND OF THE INVENTION

1. Field of the Invention

The invention relates to a method for providing price information to subscribers of a digital mobile communication network.

2. Description of Related Art

There are a large number of different prices and price systems in telecommunications, particularly for digital mobile communication networks. The prices depend, inter alia, on the price group chosen by the subscriber, on the time of day, on the destination communication network and the distance (domestic/international).

Although the subscribers that choose mobile communication networks are generally well informed about the individual call prices, it is nevertheless difficult to obtain an overview of the call costs that should actually be expected.

Another problem is what is referred to as mobile number portability (MNP). MNP means that it is possible for a subscriber to a specific mobile radio network to retain his original call number even on changing to a different mobile radio network. It is thus no longer possible for a caller to determine the price for the intended call directly on the basis of the number which he has dialed. For example, MNP means that a dialed call number 0171 1234567 which was originally allocated to the German D1 mobile radio network could now belong to a subscriber who has changed to a different German mobile radio network, so that the call price is more expensive than originally assumed.

BRIEF SUMMARY OF THE INVENTION

The object of the invention is to specify a method for providing price information to subscribers of a digital mobile communication network, which informs the subscriber directly of the costs of an intended call, in a simple manner.

According to the invention, at the moment when the connection is set up—or else even before a connection is actually set up—the calling subscriber receives a short message (SMS) which informs the subscriber of the price of the following call. The subscriber can, of course, switch off this function.

If the subscriber is informed before setting up the desired connection, he can allow or terminate the rest of the process for setting up the connection by acknowledgement of the transmitted price information.

A specific SMS type may be used for price information, in which the SMS firstly appears directly on the display of the mobile radio terminal—generally below the display of the active network—and secondly is not stored in the subscriber's SIM card, as is normally done with conventional SMS. This form of SMS is also already used in mobile radio networks, for example for notification that an SMS has been received. This is preferably the high-priority short message, referred to as the high-priority SMS. This short message is made available in a short time and is displayed immediately on the subscriber's mobile radio terminal display.

In order that the subscriber does not receive an SMS relating to price information whenever a call attempt is made, the transmission of the SMS can be restricted to situations in which the actual price is not the same as would have been expected on the basis of the chosen call number. This is the situation in particular for calls to subscribers with an MNP call number, or else when calling special call numbers, etc.

BRIEF DESCRIPTION OF THE SEVERAL VIEWS OF THE DRAWINGS

One exemplary embodiment of the invention will be explained in more detail with reference to FIG. 1, describing further features, advantages and applications of the invention.

DETAILED DESCRIPTION OF THE INVENTION

Figure 1:
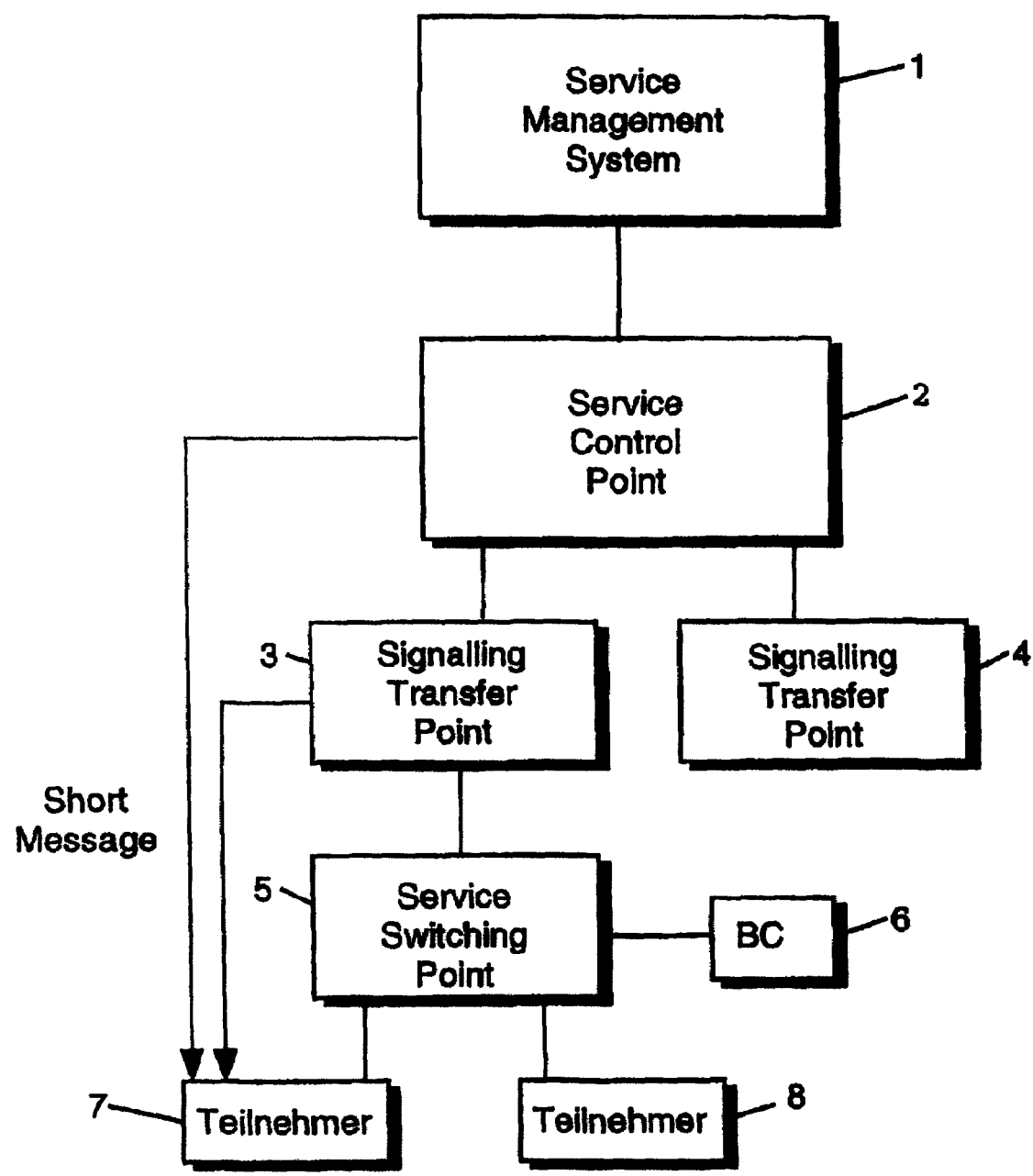
FIG. 1 shows, schematically, the logical layout of an IN architecture for a digital mobile radio network, for example of the GSM type.

The process of setting up a connection and of relaying a call is controlled by what are referred to as signaling points, in particular the service control point 2 (SCP) and the service switching points 5 (SSP), which are controlled by a higher-level service management system 1.

The service control point 2 is used to manage the network points and include the service logic at the control level, which is required for a rapid and flexible connection process. Because SCP 2 also passes on connection information, for example for charge recording and statistics, to other network elements.

The service switching point 5 is in a network node with network access and a switching function and has direct influences to the subscriber terminals 7, 8. The billing center 6 (BC) can also be set up in the area of the SSP 5.

Signaling transfer points 3, 4 (STP) for network signaling are located between the SCP 2 and the SSP 5. STP are used for passing signaling messages between the individual service and signaling points, although we can also carry out other tasks within the scope of signaling.

The network elements in the mobile radio network which are used for the actual core transmission process, such as mobile radio terminals (MS), base stations (BTS) and their controllers (BSC), mobile switching centers (MSC) etc are not shown in FIG. 1. These elements are connected via appropriate interfaces to the signaling points described above.

According to the invention, an SMS for price information is initiated by the network elements which fixes the prices for the call. In the case of a subscriber who has a subscriber relationship of what is referred to as a prepaid basis, the system, for example, is SCP 2. When setting up a call, the subscriber 7 receives from the SCP 2, or initiates by the SCP, an SMS about the connection costs to be expected. This is illustrated by a logic value SCP 2 to the subscriber 7. The method, for example, "this call costs DM 1.29 per minute" then appears on the subscriber's mobile radio terminal display.

In the case of subscribers with a regular contract relationship, the STP 3 initiates the sending of the SMS relating to price information, since, in this case, STP also fixes the port for a subscriber. This is likewise illustrated by an arrow.

The invention claimed is:

1. A method for providing price information to subscribers of a digital mobile communications network, in which the subscriber receives actual connection costs to be expected in response to dialing a call number and, on dialing a call number, the actual connection costs to be expected is displayed directly on a subscriber's mobile radio terminal display using a high-priority short message service (SMS), characterized in that the price information is provided only when the actual price is not the same as the price to be expected on the basis of a dialed call number and the dialed call number is a mobile number portability (MNP) call number or a special call number.

2. The method as claimed in claim 1, wherein the subscriber receives the actual connection costs while setting up the desired connection.

3. The method as claimed in claim 1, wherein the subscriber receives the actual connection costs before setting up the desired connection.

4. The method as claimed in claim 1, wherein the subscriber allows the connection to be set up by confirmation of the transmitted actual connection costs.

5. A system for providing price information to subscribers of a digital mobile communications network, in which the subscriber receives from a communications point actual connection costs to be expected in response to dialing a call number and, on dialing a call number, the actual connection costs to be expected is displayed directly on a subscriber's mobile radio terminal display using a high-priority short message service (SMS), characterized in that the price information is provided only when the actual price is not the same as the price to be expected on the basis of a dialed call number and the dialed call number is a mobile number portability (MNP) call number or a special call number.

6. The system as claimed in claim 5 wherein the subscriber receives the actual connection costs while setting up the desired connection.

7. The system as claimed in claim 5 wherein the subscriber receives the actual connection costs before setting up the desired connection.

8. The system as claimed in claim 5 wherein the subscriber allows the connection to be set up by confirmation of the transmitted actual connection costs.

* * * * *